United States Patent
Maita et al.

(10) Patent No.: US 7,755,791 B2
(45) Date of Patent: Jul. 13, 2010

(54) IMAGE PROCESSING APPARATUS AND IMAGE FORMING APPARATUS

(75) Inventors: Yutaka Maita, Tokyo (JP); Junichi Ikeda, Tokyo (JP); Satoru Numakura, Tokyo (JP); Atsuhiro Oizumi, Tokyo (JP); Koji Oshikiri, Tokyo (JP); Tohru Sasaki, Tokyo (JP); Yasuyuki Shindoh, Tokyo (JP); Koji Takeo, Tokyo (JP); Noriyuki Terao, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1020 days.

(21) Appl. No.: 11/399,440

(22) Filed: Apr. 7, 2006

(65) Prior Publication Data

US 2006/0227143 A1    Oct. 12, 2006

(30) Foreign Application Priority Data

Apr. 11, 2005    (JP)    ............................. 2005-113757

(51) Int. Cl.
*G06F 3/12*    (2006.01)
*G06K 15/00*    (2006.01)

(52) U.S. Cl. ...................... 358/1.15; 358/1.16; 358/1.13
(58) Field of Classification Search ................ 358/1.15, 358/1.16, 1.17, 1.1, 1.2, 1.4, 1.6, 1.9, 1.13, 358/1.14, 1.18, 400, 401, 404, 444, 407, 358/448, 468, 474; 347/2, 3, 5, 14, 23; 399/1, 399/8, 9; 710/1, 8, 13, 14, 15, 20, 22, 23, 710/52, 62, 64, 65, 72, 310, 308, 313, 314, 710/315; 382/232, 276, 312
See application file for complete search history.

(56) References Cited

U.S. PATENT DOCUMENTS

| 2003/0227637 | A1* | 12/2003 | Tanaka | .................... 358/1.3 |
| 2004/0172494 | A1* | 9/2004 | Pettey et al. | .............. 710/305 |
| 2005/0066073 | A1* | 3/2005 | Jacobs et al. | ................ 710/15 |

FOREIGN PATENT DOCUMENTS

| JP | 2004-56590 | 2/2004 |
| JP | 2004-112626 | 4/2004 |

OTHER PUBLICATIONS

Takashi Satomi, "Chapter 4: The Standard of High Speed Extension Bus in Future", Outline of the PCI Express Standard, Jul. 2003, pp. 80-93 (With English Translation).

* cited by examiner

*Primary Examiner*—Dov Popovici
(74) *Attorney, Agent, or Firm*—Oblon, Spivak, McClelland, Maier & Neustadt, L.L.P.

(57) ABSTRACT

An image forming apparatus includes an image input device that reads an image to obtain image data and a printer engine that forms an image on a medium based on image data. A bus of a PCI Express standard is used to transfer data. Storage areas serving as end points of the standard and hardware resources that transmit data and receive image data to and from the storage areas are connected to an identical switch according to the PCI Express standard. Specifically, an input/output area, an image input device, and a printer engine are connected to one switch, and a storage area, a compressor, and a hard disk is connected to another switch.

13 Claims, 19 Drawing Sheets

FIG. 14

| STATE | CONDITION | TIME REQUIRED TO RECOVER TO L0 |
|---|---|---|
| L0 | ACTIVE (NORMAL) | |
| LOS | LINK HAS COMMON MODE VOLTAGE CLOCK AND MAIN POWER SUPPLY ARE ON | 16 NS TO 4 $\mu$ S |
| L1 | LINK HAS COMMON MODE VOLTAGE CLOCK IS OFF AND MAIN POWER SUPPLY IS ON | 1 TO SEVERAL TENS OF $\mu$ S |
| L2 | CLOCK AND MAIN POWER SUPPLY ARE OFF SUPPLY POWER WHEN THERE IS AUXILIARY POWER SUPPLY (Vaux) | DEPENDENT ON SYSTEM |

RESET TIME FROM L2 DEPENDS ON RISING TIME AND LIKE OF POWER SUPPLY AND PLL

IMAGE PROCESSING APPARATUS AND IMAGE FORMING APPARATUS

CROSS-REFERENCE TO RELATED APPLICATIONS

The present document incorporates by reference the entire contents of Japanese priority document, 2005-113757 filed in Japan on Apr. 11, 2005. The present document incorporates by reference the entire contents of Japanese application, 2004-127942 filed in Japan on Apr. 23, 2004.

BACKGROUND OF THE INVENTION

1. Field of the Invention

The present invention relates to an image processing apparatus that processes image data, and an image forming apparatus that reads an image and forms an image on a medium.

2. Description of the Related Art

A high-speed serial interface called a Peripheral Component Interconnect (PCI) Express (registered trademark) corresponding to a successor standard of the PCI bus system is proposed (for example, Interface, July 2003, "Outline of the PCI Express Standard" by Takashi Satomi).

FIG. 22 is a schematic diagram for explaining flows of image data in a conventional digital copying machine including special-purpose and general-purpose buses. The flows of image data are indicated by arrows.

In a digital copying machine 201 shown in FIG. 22, image data read by an image input device 202 is temporarily stored in a memory 203 and is output to a printer engine 204 to form an image. The digital copying machine 201 has a function of compression-encoding the image data stored in the memory 203 with a compressor 208, and of storing the image data in the memory 203 again or in a hard disk (HD) 205. An input/output area 206 of the memory 203 is a storage area that temporarily stores the image data read by the image input device 202. A storage area 207 is a storage area that stores the image data compression-encoded by the compressor 208. Input of data to and output of data from the memory 203 are arbitrated by an arbiter 209 and performed by a memory bus 210.

However, in such a conventional system, as described above, image data always passes through the memory bus 210 when the image data is processed. Thus, a shortage of bands of the memory bus 210 can occur. For example, it is assumed that a data transfer rate from the image input device 202 to the memory 203 is 15 MBytes/sec, a data transfer rate from the memory 203 to the printer engine 204 is 20 MBytes/sec, a data transfer rate from the memory 203 to the compressor 208 is 25 MBytes/sec, a data transfer rate from the compressor 208 to the memory 203 is 25 MBytes/sec, and a data transfer rate from the memory 203 to the HDD 205 is 50 MBytes/sec. Start times and end times of the respective data transfers and a sum of the data transfer rates of the memory bus 210 in this case are shown in FIG. 23. It is assumed that the start time and the end time of the data transfer from the image input device 202 to the memory 203 are 0 second and 0.60 second, respectively, the start time and the end time of the data transfer of the image data on the memory 203 to the printer engine 204 are 0.36 second and 0.81 second, respectively, the start time and the end time of the data transfer of the image data on the memory 203 to the compressor 208 are 0.48 second and 0.66 second, respectively, the start time and the end time of the data transfer from the compressor 208 to the memory 203 are 0.48 second and 0.66 second, and the start time and the end time of the data transfer of the compression-encoded data on the memory 203 to the HDD 205 are 0.57 second and 0.75 second respectively. Then, a data transfer at a rate of 135 MBytes/sec occurs in a period between 0.57 second and 0.60 second when the respective data transfers overlap one another.

SUMMARY OF THE INVENTION

It is an object of the present invention to at least solve the problems in the conventional technology.

An image processing apparatus according to one aspect of the present invention processes image data includes a bus configured to transfer data; a switch configured to transfer data; a storage area configured to store image data; and a hardware resource configured to transmit and receive image data. The storage area and the hardware resource are connected to the switch.

An image forming apparatus according to another aspect of the present invention includes an image input device configured to read an image an original to obtain image data; and a printer engine configured to form an image on a medium based on the image data. Data transmission is performed through a bus that is PCI Express compatible, and a storage area serving as an end point of a PCI Express standard and a hardware resource configured to transmit and receive image data to and from the storage area are connected to an identical switch that is the PCI Express compatible.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a chart for explaining link states L0, L0s, L1, and L2;

DETAILED DESCRIPTION OF THE PREFERRED EMBODIMENTS

Exemplary embodiments according to the present invention are explained in detail below with reference to the accompanying drawings.

In the following explanations, details of a PCI Express and a digital copying machine according to the embodiments of the present invention are described.

In the embodiments, the PCI Express, which is a type of a high-speed serial bus, is used. The PCI Express standard is explained below according to an excerpt from Interface, July 2003, "Outline of a PCI Express standard" by Takashi Satomi. The high-speed serial bus is an interface that enables data exchange at high speed (equal to or higher than approximately 100 megabytes per second (Mbps)) according to serial transmission using one transmission channel.

The PCI Express is a bus standardized as a standard extended bus that is used in all kinds of computers as a succeeding standard of the PCI. Briefly, the PCI Express has characteristics of low-voltage differential signal transmission, point-to-point communication channels independent for transmission and reception, packetized split transaction, high scalability due to a difference of link constitutions, and the like.

Figure 1:
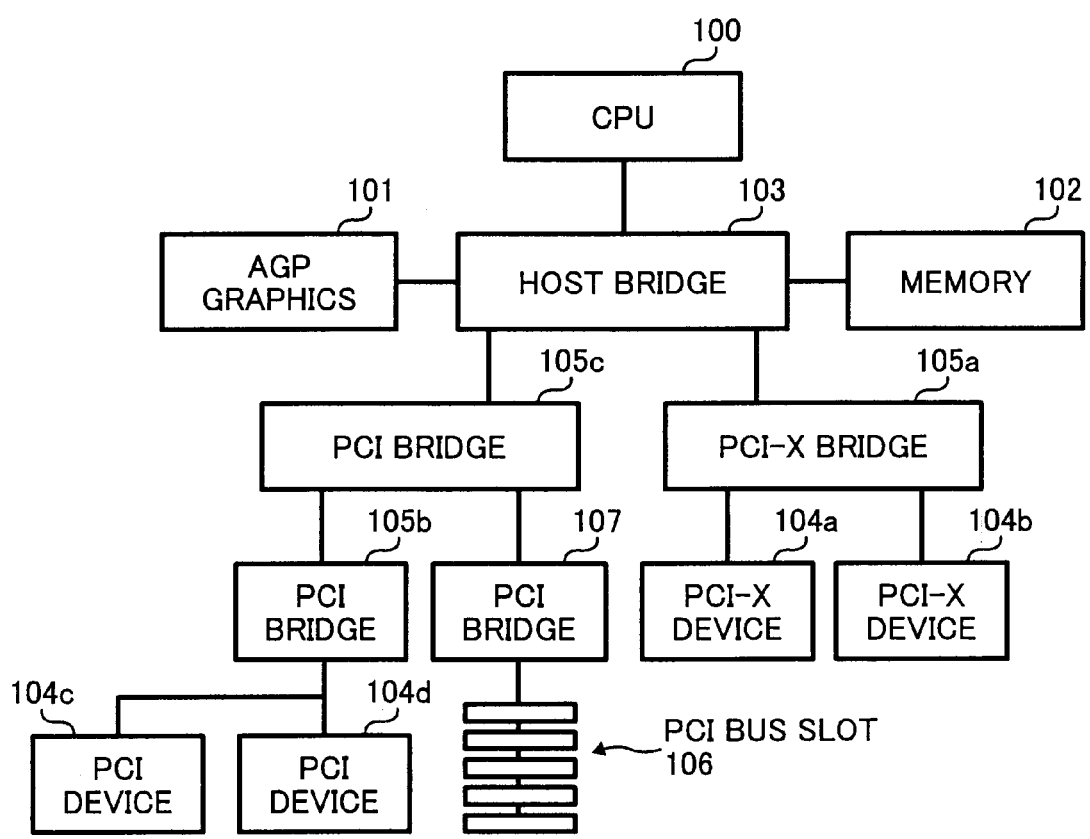
FIG. 1 is a block diagram of an existing PCI system.
Figure 2:
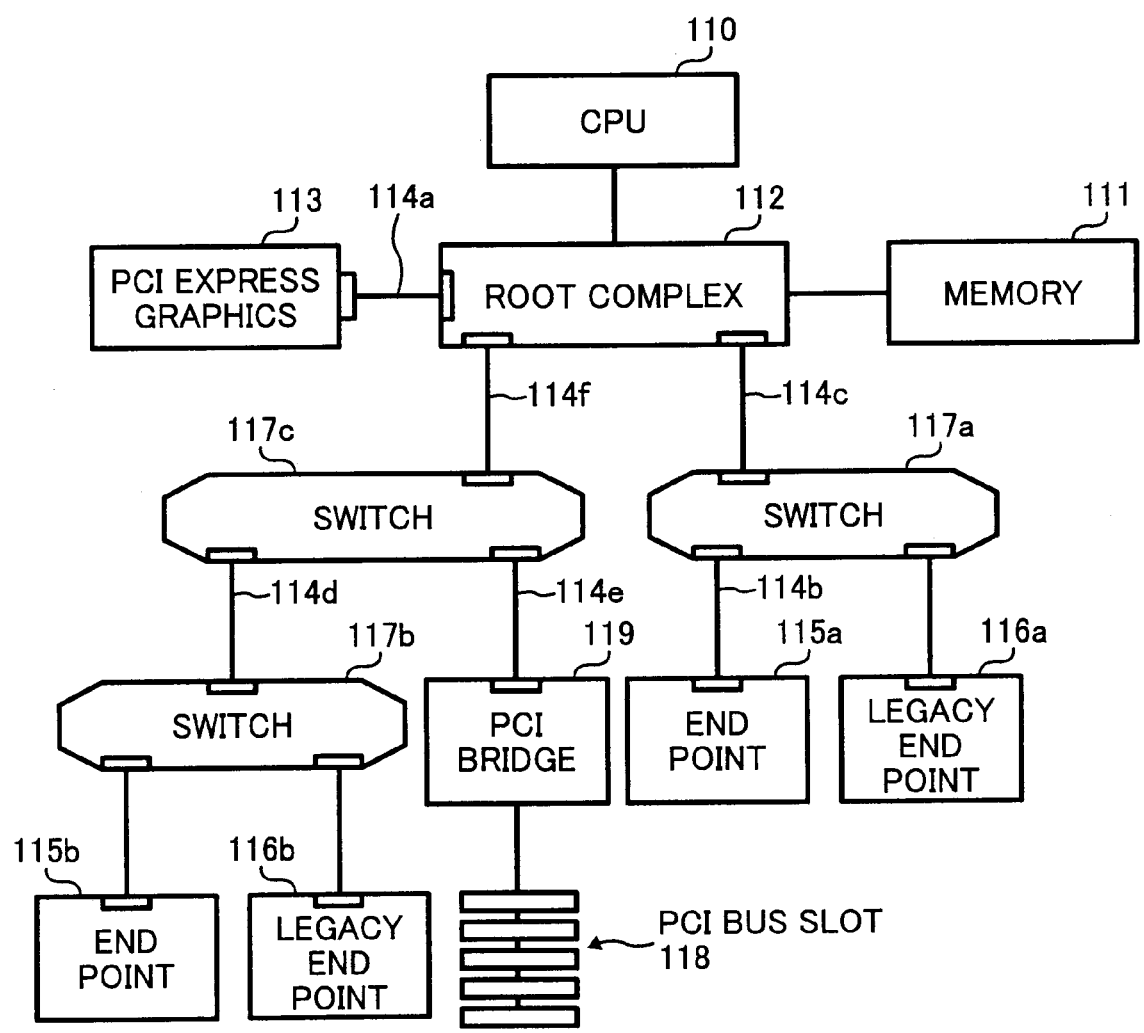
FIG. 2 is a block diagram of a PCI Express system.

An example of a constitution of the existing PCI system is shown in FIG. 1. An example of a constitution of a PCI Express system is shown in FIG. 2. In the existing PCI system, PCI-X (an upper compatible standard of the PCI) devices 104a and 104b are connected to a host bridge 103 via a PCI-X bridge 105a. A central processing unit (CPU) 100, an accelerated graphics port (AGP) graphics 101, and a memory 102 are connected to the host bridge 103. A PCI bridge 105b and a PCI bridge 107 are connected to the host bridge 103 via a PCI bridge 105c. PCI devices 104c and 104d are connected the PCI bridge 105b. A PCI bus slot 106 is connected to the PCI bridge 107. In this way, the existing PCI system is formed in a tree structure.

On the other hand, the PCI Express system, a PCI Express graphics 113 is connected to a root complex 112 by a PCI Express 114a. A CPU 110 and a memory 111 are connected to the root complex 112. A switch 117a is connected to the root complex 112 by a PCI Express 114c. An end point 115a and a legacy end point 116a are connected to the switch 117a by PCI Expresses 114b. A switch 117c is connected to the root complex 112 by a PCI Express 114f. A switch 117b and a PCI bridge 119 are connected to the switch 117c by a PCI Express 114d and a PCI Express 114e. An end point 115b and a legacy end point 116b are connected to the switch 117b. A PCI bus slot 118 is connected to the PCI bridge 119. In this way, the PCI Express system is formed in a tree structure.

Figure 3:
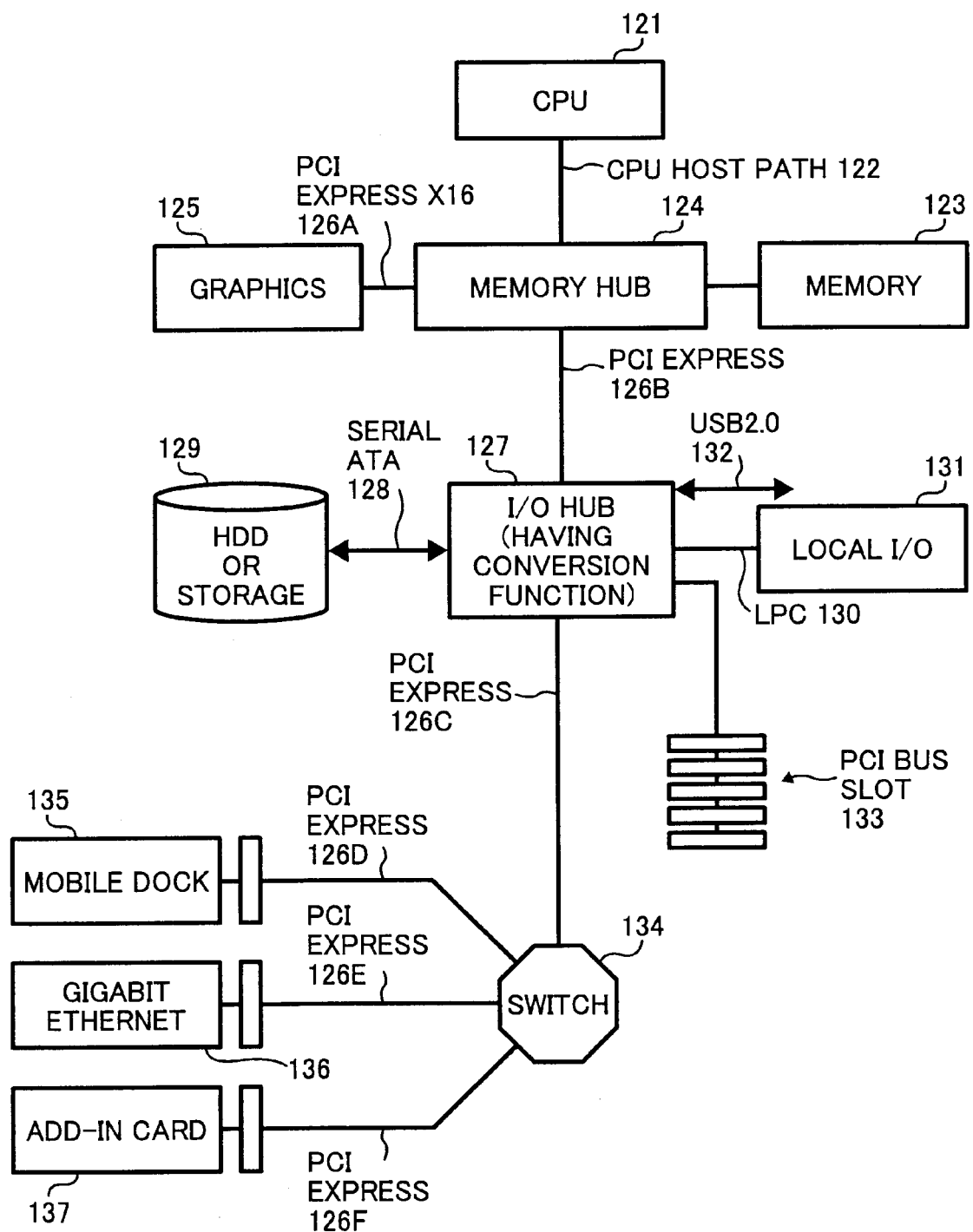
FIG. 3 is a block diagram of a PCI Express platform in desktop/mobile devices.

An example of a PCI Express platform actually assumed is shown in FIG. 3. The example shown in the figure is an example of application of the PCI Express platform to desktop/mobile devices. A CPU 121 is connected to a memory hub 124 (equivalent to a root complex) by a CPU host bus 122. A memory 123 is also connected to the memory hub 124. To the memory hub 124, for example, a graphics 125 is connected by a PCI Express x16 126a and an I/O hub 127 having a conversion function is connected by a PCI Express 126b. For example, an HDD or storage 129 is connected to the I/O hub 127 by a serial advanced technology attachment (ATA) 128. A local I/O 131 is connected to the I/O hub 127 by a low pin count (LPC) 130. Further, a universal serial bus (USB) 2.0 132 and a PCI bus slot 133 are connected to the I/O hub 127. Moreover, a switch 134 is connected to the I/O hub 127 by a PCI Express 126c. A mobile dock 135, a gigabit Ethernet (registered trademark) 136, and an add-in card 137 are connected to the switch 134 by PCI Expresses 126d, 126e, and 126f, respectively.

In the PCI Express system, the conventional buses such as the PCI bus, the PCI-X bus, and the AGP bus are replaced with the PCI Expresses and the bridges are used to connect the existing PCI/PCI-X devices. Chip sets are also connected by PCI Expresses. The existing buses such as the IEEE1394 bus, the Serial ATA bus, and the USB 2.0 bus are connected to the PCI Expresses by the I/O hub.

A. Port/Lane/Link

Figure 4:
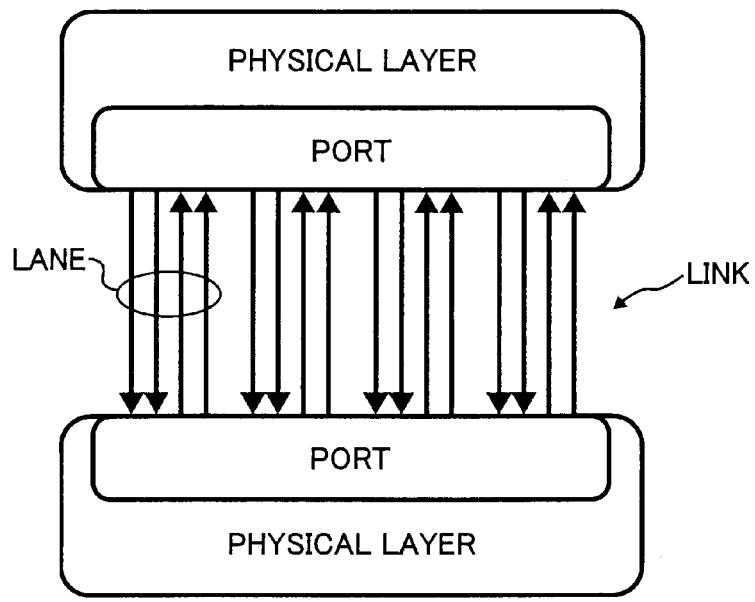
FIG. 4 is a schematic diagram of a physical layer in a case of x4.
Figure 5:
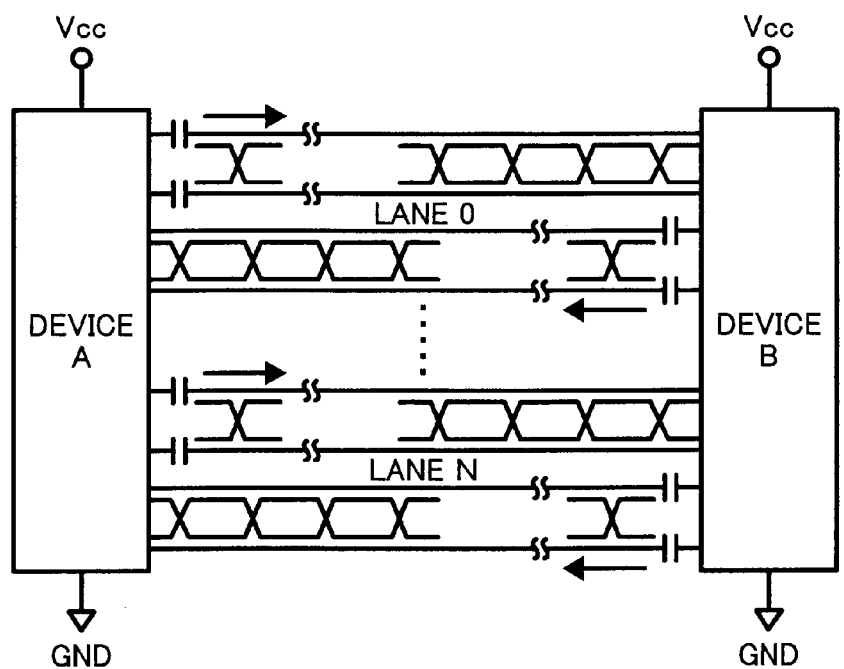
FIG. 5 is a schematic diagram of lane connection between devices.

A physical structure is shown in FIG. 4. A port physically means a set of transmitters/receivers that are present in identical semiconductor and form a link and logically means an interface that connects components in a one-to-one relation (point-to-point). A transfer rate is set to, for example, 2.5 gigabyte per second (Gbps) in one direction (in future, transfer rates of 5 Gbps and 10 Gbps are assumed). A lane is, for example, a set of differential signal pairs of 0.8 volt and includes a signal pair (two signals) on a transmission side and a signal pair (two signals) on a reception side. A link is a group of two ports and lanes connecting the two ports and is a dual simplex communication bus between components. An "xN" link is formed of N lanes. In the present standard, N is defined as 1, 2, 4, 8, 16, and 32. The example shown in the figure is an example of an x4 link. For example, as shown in FIG. 5, it is possible to constitute a scalable band width by changing the number of lanes (a lane width) N connecting devices A and B.

B. Root Complex

The root complex 112 is located at the top of an I/O structure and connects a CPU and a memory subsystem to the I/O. In a block diagram and the like, as shown in FIG. 3, the root complex 112 is often described as "memory hub". The root complex 112 (or 124) has one or more PCI Express ports (root ports) (in FIG. 2, indicated by squares in the root complex 112). The respective ports form independent I/O hierarchical domains. The I/O hierarchical domains are simple end points in some cases (e.g., the I/O hierarchical domain on the end point 115a side in FIG. 2) and are formed of a large number of switches or end points in other cases (e.g., the I/O hierarchical domain on the end point 115b and switches 117b and 117c side).

C. End Point

The end points 115 and 116 are devices having a configuration space header of a type 0h (specifically, devices other than bridges) and are divided into a legacy end point and a PCI Express end point. A major difference between the legacy end point and the PCI Express end point is that the PCI Express end point is a Base Address Register (BAR) and does not require an I/O port resource. Therefore, the PCI Express end point does not require an I/O request. Further, the PCI Express end point does not support a lock request.

D. Switch

Figure 6:
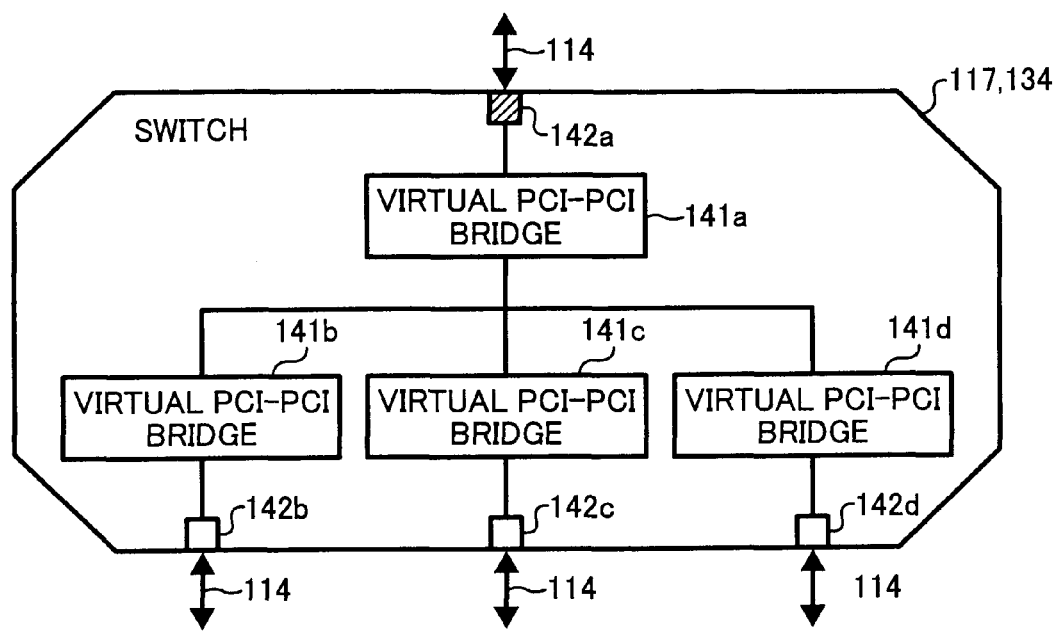
FIG. 6 is a schematic diagram illustrating a logical structure of a switch.

The switch 117 (or 134) connects two or more ports and performs packet routing among the ports. Configuration software recognizes the switch 117 as an aggregate of virtual PCI-PCI bridges 141 as shown in FIG. 6. In the figure, arrows indicate PCI Express links 114 (or 126) and reference signs 142a to 142b denote ports. Among the ports, the port 142a is an upstream port closer to the root complex 112 and the ports 142b to 142d are downstream ports distant from the root complex 112.

E. PCI Express 114e—PCI Bridge 119

Connection from the PCI Expresses to the PCI/PCI-x devices is provided. This makes it possible to use the existing PCI/PCI-X devices on the PCI Express system.

Figure 7A:
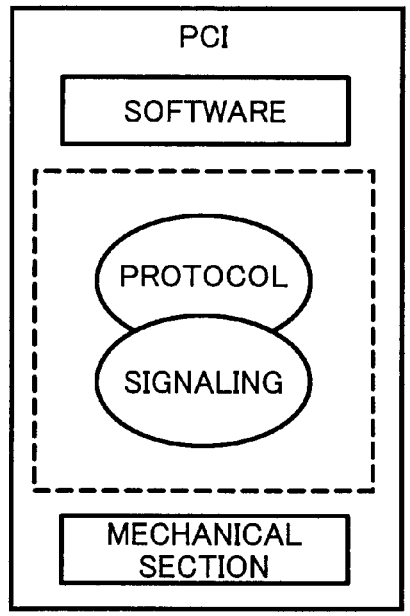
FIG. 7A is a schematic diagram for illustrating architecture of the existing PCI.
Figure 7B:
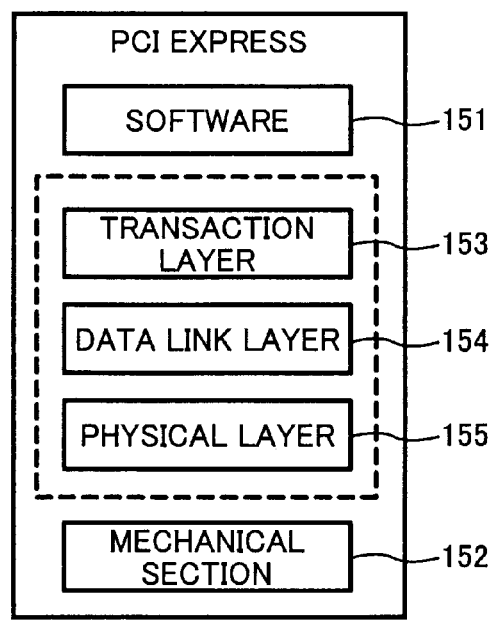
FIG. 7B is a schematic diagram for illustrating architecture of the PCI Express.

The conventional PCI architecture is a structure in which a protocol and signaling are closely related to each other as shown in FIG. 7A. Thus, an idea of a hierarchy is not included in the PCI architecture. However, as shown in FIG. 7B, in a PCI Express architecture, an independent hierarchical structure is adopted and specifications are defined for respective layers as in a general communication protocol and the Infini-Band. The PCI Express architecture includes a transaction layer 153, a data link layer 154, and a physical layer 155 between software 151 of a highest layer and a mechanical section 152 of a lowest layer. Consequently, modularity of the respective layers is secured to make it possible to give scalability to the architecture and reuse modules. For example, when a new signal coding system or a new transmission medium is adopted, it is possible to cope with the new signal coding system or the new transmission medium only by changing the physical layer 155 without changing the data link layer 154 and the transaction layer 153.

The transaction layer 153, the data link layer 154, and the physical layer 155 are main components of the PCI Express architecture and play roles explained below with reference to FIG. 8.

A. Transaction Layer 153

Figure 9:
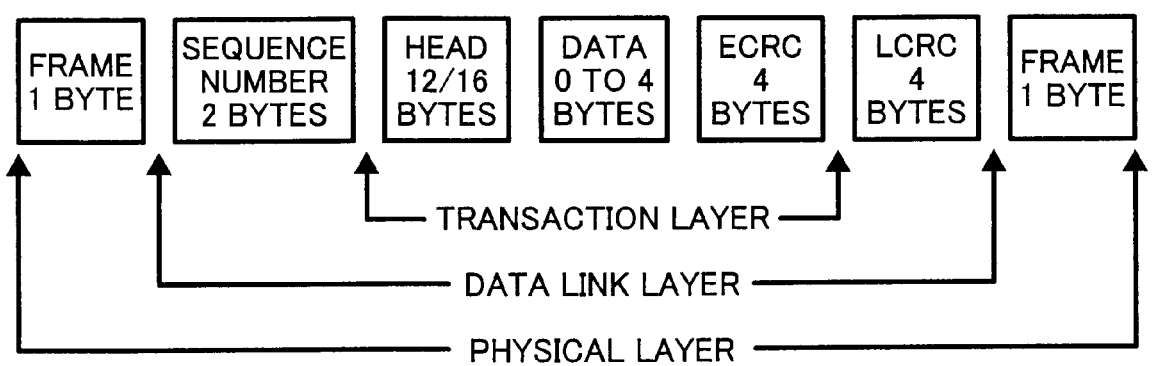
FIG. 9 is a schematic diagram for illustrating a format of a transaction layer packet.

The transaction layer 153 is located at the top and has a function of assembling and disassembling a transaction layer packet (TLP). The transaction layer packet (TLP) is used for transmission of transactions such as read/write and various events. The transaction layer 153 performs flow control using a credit for the transaction layer packet (TLP). The transaction layer packet (TLP) in the respective layers 153 to 155 is schematically shown in FIG. 9 (details of the transaction layer packet (TLP) are described later).

B. Data Link Layer 154

Main roles of the data link layer 154 are to guarantee data integrity of the transaction layer packet (TLP) through error detection/correction (retransmission) and to perform link management. A packet for link management and flow control is exchanged between the data link layer 154 and another data link layer 154. This packet is called a data link layer packet (DLLP) to distinguish the packet from the transaction layer packet (TLP).

C. Physical Layer 155

The physical layer 155 includes circuits necessary for interface operations like a driver, an input buffer, parallel-serial/serial-parallel converters, a phase lock loop (PLL), and an impedance matching circuit. The physical layer 155 has a function of initialization and maintenance of an interface as a logical function. The physical layer 155 also has a role of isolating the data link layer 154 and the transaction layer 153 from a signal technology used in an actual link.

A technology called embedded clock is adopted because of a hardware configuration of the PCI Express. There is no clock signal and timing of a clock is embedded in data signals. The clock is extracted on a reception side based on a cross point of the data signals.

Figure 10:
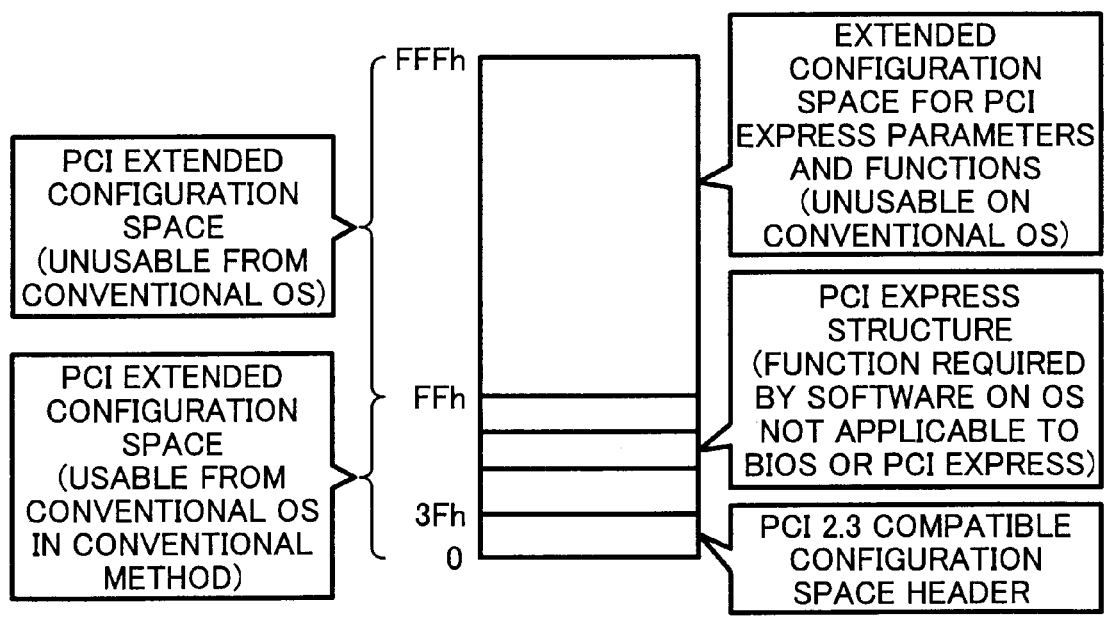
FIG. 10 is a schematic diagram for illustrating a configuration space of the PCI Express.

The PCI Express has a configuration space as in the conventional PCI. However, whereas the conventional PCI has a size of 256 bytes, a size of the PCI Express is extended to 4096 bytes as shown in FIG. 10. Consequently, it is expected that a sufficient space is also secured for devices (a host bridge, etc.) that require a large number of device specific register sets. In the PCI Express, access to the configuration space is performed according to access to a flat memory space (configuration read/write) and a bus, a device, a function, and a register number are mapped to a memory address.

It is possible to access top 256 bytes of the space as a PCI configuration space from a basic input output system (BIOS) or the conventional operating system (OS) with a method that uses an I/O port. A function of converting the conventional access into the access in the PCI Express is packaged on a host bridge. 00h to 3Fh is a PCI2.3 compatible configuration header. Therefore, it is possible to directly use the conventional OS and software for functions other than those extended by the PCI Express. In other words, a software layer in the PCI Express succeeds a load store architecture that keeps compatibility with the existing PCI (a system in which a processor directly accesses an I/O register). However, to use the functions extended by the PCI Express (e.g., functions like synchronous transfer and reliability, availability, and serviceability (RAS)), it is necessary to make it possible to access a PCI Express extended space of 4K bytes.

Various form factors (shapes) are conceivable as the PCI Express. As specific examples, there are an add-in card, a plug-in card (NEWCARD), a mini PCI Express, and the like.

The transaction layer 153, the data link layer 154, and the physical layer 155, which are main components of the architecture of the PCI express, are explained in detail below.

A. Transaction Layer 153

As described above, a main role of the transaction layer 153 is to assemble and disassemble the transaction layer packet (TLP) between the higher software layer 151 and the lower data link layer 154.

a. Address Space and Transaction Type

In the PCI Express, a message space (for in-band event notification and general message transmission (exchange) between PCI Express devices: interrupt request and confirmation are transmitted by using a message as a "virtual wire") is provided in addition to a memory space (for a data transfer to and from the memory space), an I/O space (for a data transfer to and from the I/O space), and a configuration space (for configuration and setup of devices) supported in the conventional PCI. Therefore, four address spaces are defined. Transaction types are defined for the respective spaces (the memory space, the I/O space, and the configuration space is read/write and the message space is basic (including vendor definition).

b. Transaction Layer Packet (TLP)

The PCI Express performs communication by a unit of packet. In the format of the transaction layer packet (TLP) shown in FIG. 9, a header length of a header is 3 double words (DW; 12 bytes in total) or 4 DW (16 bytes). The header includes information like a format (a header length and presence or absence of payload) of the transaction layer packet (TLP), a transaction type, a traffic class (TC), attributes, and a payload length. A maximum payload length in a packet is 1024 DW (4096 bytes).

An End-to-end CRC (ECRC) is a cyclic redundancy check (CRC) for guaranteeing end-to-end data integrity and is a 32 bit CRC of the transaction layer packet (TLP). This CRC is provided because, when an error occurs in the transaction layer packet (TLP) inside a switch or the like, it is impossible to detect the error with a Link CRC (LCRC) (the LCRC is recalculated in the TLP in which the error occurs).

A completion packet is required for some requests and is not required for other requests.

c. Traffic Class (TC) and Virtual Channel (VC)

Higher order software can discriminate (prioritize) traffics by using traffic classes (TC). For example, it is possible to transfer video data more preferentially than data of a network. There are eight traffic classes TC0 to TC7.

Figure 11:
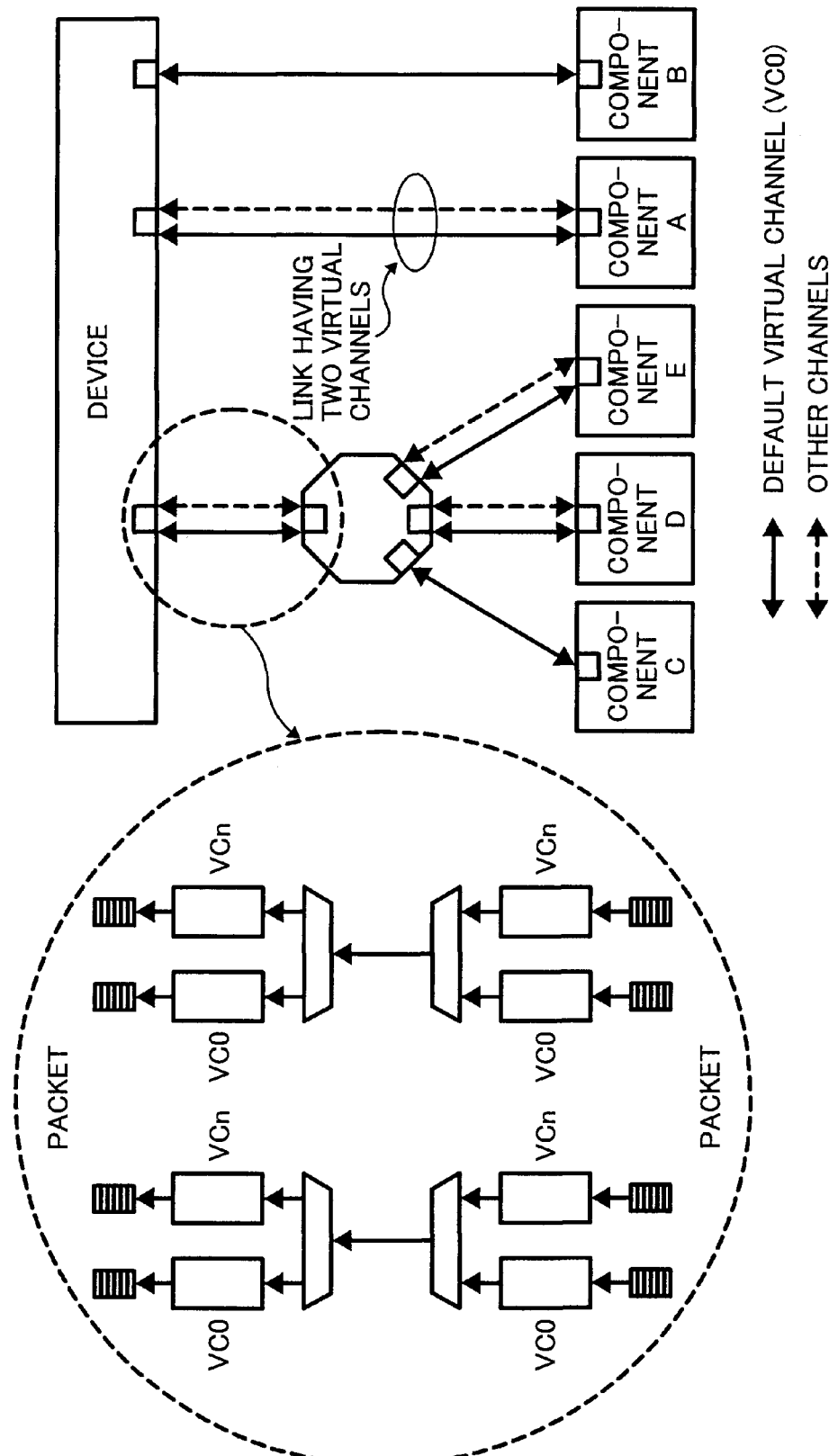
FIG. 11 is a schematic diagram for illustrating a concept of a virtual channel.

Virtual channels (VC) are virtual communication buses independent from one another (a mechanism for using a plurality of independent data flow buffers that share an identical link). The respective virtual channels (VC) have resources (buffers and queues) and perform independent flow control as shown in FIG. 11. Consequently, even if a buffer of one virtual channel is full, it is possible to perform transfers in other virtual channels. In other words, it is possible to effectively use a physically single link by dividing the link into a plurality of virtual channels. For example, as shown in FIG. 11, when a link of a route is divided into a plurality of devices through a switch, it is possible to control priorities of traffics of the respective devices. A virtual channel VC0 is essential and other virtual channels (VC1 to VC7) are packaged according to tradeoff of cost performance. A solid line arrow in FIG. 11 indicates the default virtual channel (VC0) and a broken line arrow indicates the other virtual channels (VC1 to VC7).

In the transaction layer, the Traffic Classes (TC) are mapped to the virtual channels (VC). It is possible to map one or more traffic classes (TC) to one virtual channel (VC) (when the number of virtual channels (VC) is small). In a simple example, it is conceivable to map the respective Traffic Classes (TC) to the respective virtual channels (VC) in a one-to-one relation or map all the Traffic Classes (TC) to the virtual channel VC0. Mapping of the Traffic Class TC0 and the virtual channel VC0 is essential and fixed and mapping of the other traffic classes and virtual channels is controlled from the higher order software. The software is capable of controlling priorities of transactions by using the Traffic Classes (TC).

d. Flow Control

Flow control (FC) is performed to prevent overflow of a reception buffer and establish a transmission order. The flow control is performed point-to-point between links and is not performed end-to-end. Therefore, it is impossible to confirm that a packet is delivered to a final receiver (a completer).

The flow control of the PCI Express is performed on a credit basis (a mechanism for checking an idle state of a buffer on a reception side before a data transfer is started to prevent occurrence of overflow and underflow). The reception side notifies a transmission side of a buffer capacity (a credit value) at the time of initialization of a link. The transmission side compares the credit value and a length of a packet to be transmitted and transmits the packet only when a fixed value of the credit value remains. There are six kinds of credits.

Exchange of information on the flow control is performed using the data link layer packet (DLLP) of the data link layer. The flow control is applied only to the transaction layer packet (TLP) and is not applied to the data link layer packet (DLLP) (it is possible to always transmit and receive the DLLP).

B. Data Link Layer 154

As described above, a main role of the data link layer 154 is to provide a highly reliable function for exchange of the transaction layer packet (TLP) between two components on a link.

a. Handling of the Transaction Layer Packet (TLP)

The data link layer 154 adds a 2-byte sequence number and a 4-byte link CRC (LCRC) to the top and the end of the transaction layer packet (TLP) received from the transaction layer 153 and passes the transaction layer packet (TLP) to the physical layer 155 (see FIG. 9). The transaction layer packet (TLP) is stored in a retry buffer and resent until a reception acknowledgment (ACK) is delivered from the physical layer 155. When transmission of the transaction layer packet (TLP) has continuously failed, the data link layer 154 judges that link abnormality has occurred, and requests the physical layer 155 to perform retraining of the link. When the trailing of the link has failed, a state of the data link layer shifts to an inactive state.

The data link layer 154 inspects the sequence number and the link CRC (LCRC) of the transaction layer packet (TLP) received from the physical layer 155. When the sequence number and the link CRC (LCRC) are normal, the data link layer 154 passes the transaction layer packet (TLP) to the transaction layer 153. When there is an error in the sequence number or the link CRC (LCRC), the data link layer 154 requests the physical layer 155 to resend the transaction layer packet (TLP).

b. Data Link Layer Packet (DLLP)

A packet generated by the data link layer 154 is called data link layer packet (DLLP) and exchanged between the data link layer 154 and another data link layer 154. As the data link layer packet (DLLP), there are the following types:

Ack/Nak: Reception acknowledgment and retry (resend) of the TLP;

InitFC1/InitFC2/UpdateFC: Initialization and update of flow control; and

DLLP for power supply management.

Figure 12:
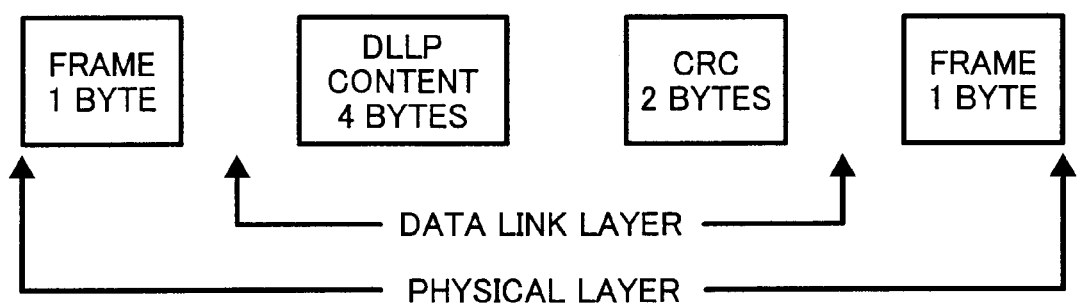
FIG. 12 is a schematic diagram for illustrating a format of a data link layer packet.

As shown in FIG. 12, a length of the data link layer packet (DLLP) is 6 bytes. The data link layer packet (DLLP) includes a DLLP type (1 byte) indicating a type of the DLLP, information (3 bytes) peculiar to the type of the DLLP, and a CRC (2 bytes).

C. Physical Layer—Logical Sub-Block 156

Figure 8:
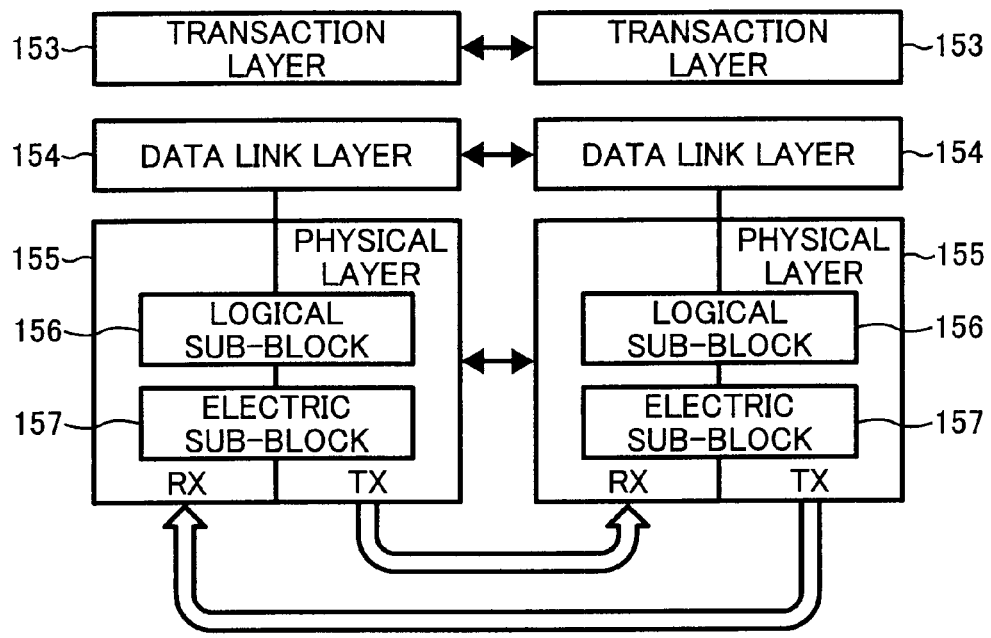
FIG. 8 is a schematic diagram for illustrating a hierarchical structure of the PCI Express.

A main role of a logical sub-block 156 of the physical layer 155 shown in FIG. 8 is to convert a packet received from the data link layer 154 into a form that can be transmitted by an electric sub-block 157. The logical sub-block 156 also has a function of controlling and managing the physical layer 155.

a. Data Encoding and Parallel-Serial Conversion

Figure 13:
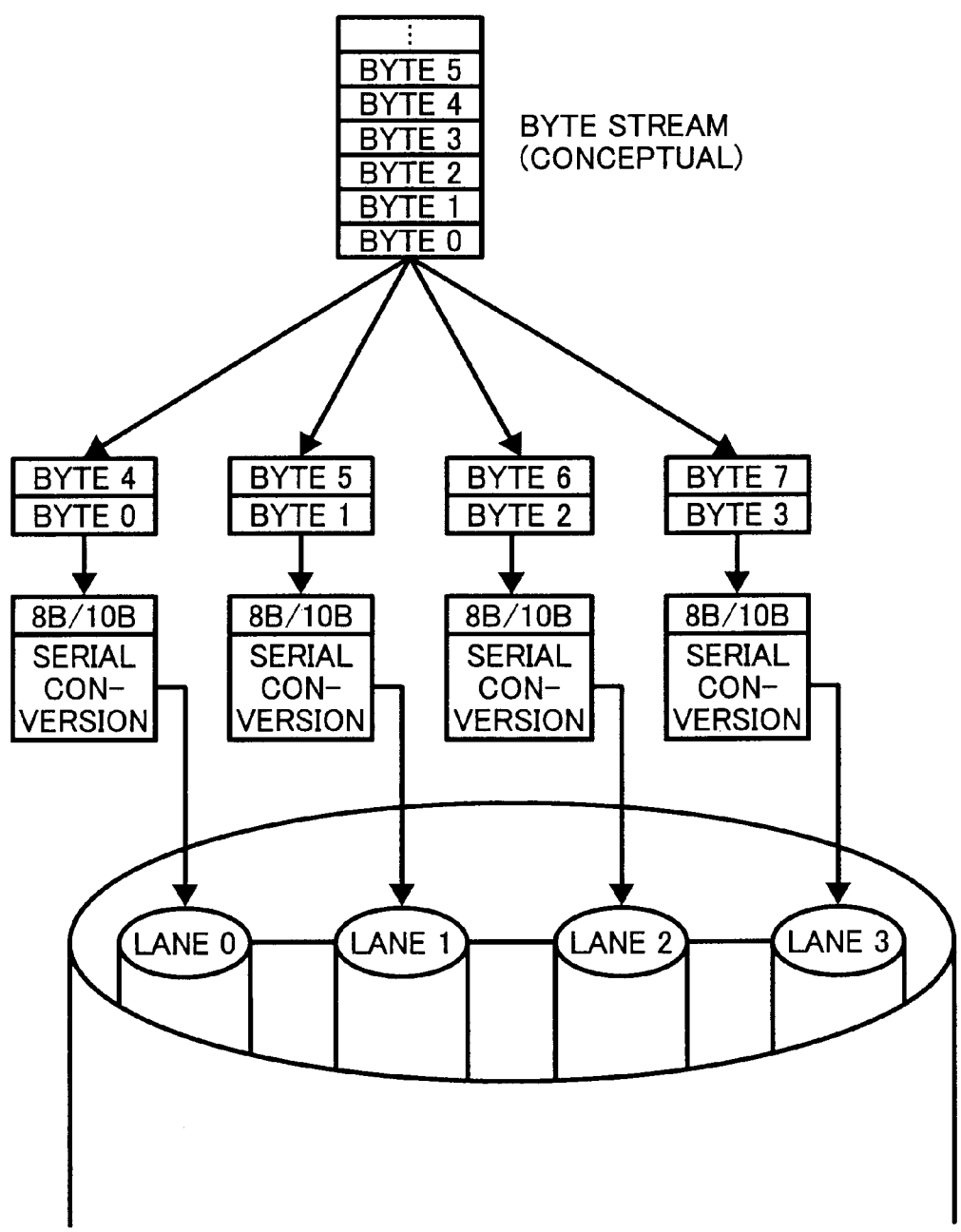
FIG. 13 is a schematic diagram of byte striping in an x4 link.

The PCI Express uses 8B/10B conversion for data encoding to prevent "0" or "1" from continuing (prevent a state without a cross point from continuing for a long period). As shown in FIG. 13, converted data is subjected to serial conversion and transmitted onto a lane in order from a least significant bit (LSB). When there are a plurality of lanes (an example of a x4 link is shown in FIG. 13), data is allocated to the respective lanes by a unit of byte before encoding. In this case, the link appears to be a parallel bus. However, since an independent transfer is performed in each of the lanes, the problem of skew in the parallel bus is significantly eased.

b. Power Supply Management and Link State

To hold down power consumption of the link, as shown in FIG. 14, link states L0, L0s, L1, and L2 are defined.

Figure 15:
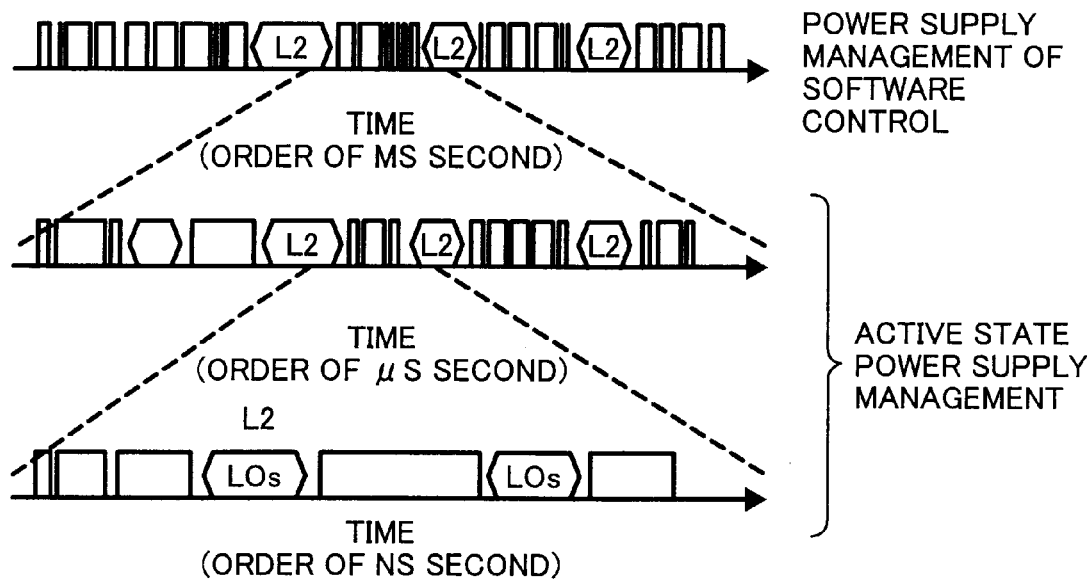
FIG. 15 is a time chart of a control of active state power supply management.

The link state L0 is a normal mode and power consumption decreases from the link state L0s to the link state L2. It takes time to reset to the link state L0. As shown in FIG. 15, it is possible to reduce power consumption as much as possible by positively performing active state power supply management in addition to power supply management by software.

D. Physical Layer-Electric Sub-block 157

Main roles of an electric sub-block 157 of the physical layer 155 are to transmit data serialized by the logical sub-block 156 onto the lane and to receive data on the lane and pass the data to the logical sub-block 156.

a. AC Coupling

A capacitor for AC coupling is packaged on the transmission side of the link. This makes it unnecessary to set DC common mode voltages on the transmission side and the reception side to an identical voltage. Therefore, it is possible to use different designs, semiconductor processes, and power supply voltages on the transmission side and the reception side.

b. De-Emphasis

In the PCI Express, as described above, data is processed by 8B/10B encoding to prevent "0" or "1" from continuing as much as possible. However, "0" or "1" continues in some cases (five times at the maximum). In this case, it is provided that the transmission side should perform de-emphasis transfer. When bits of an identical polarity continue, it is necessary to gain a noise margin of a signal received on the reception side by reducing a differential voltage level (an amplitude) by 3.5±0.5 decibels from a second bit. This is referred to as de-emphasis. In the case of changing bits, there are a large quantity of high-frequency components because of frequency dependency attenuation of a transmission channel. A waveform on the reception side is reduced in size by the attenuation. However, in the case of unchanging bits, there are a small quantity of high-frequency components and a waveform on the reception side is relatively increased in size. Therefore, de-emphasis is performed to fix a waveform on the reception side.

Figure 16:
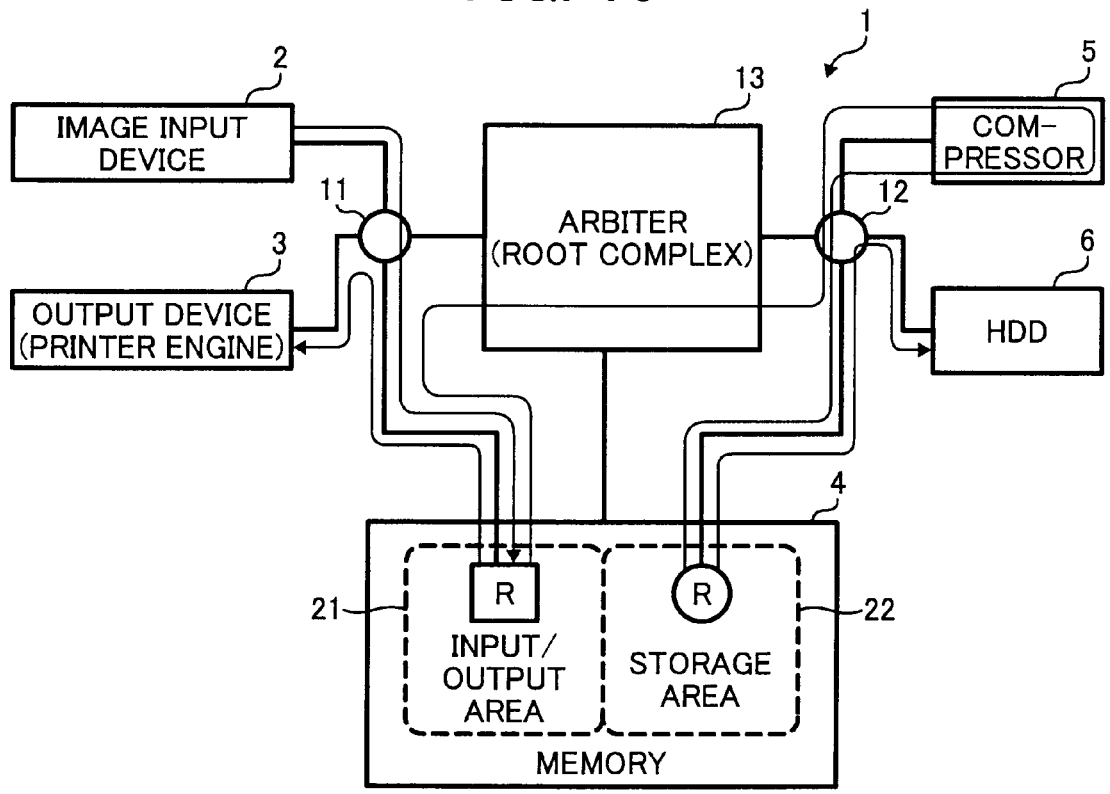
FIG. 16 is a block diagram of a digital copying machine according to a first embodiment of the present invention.

FIG. 16 is a block diagram of a digital copying machine 1 according to a first embodiment of the present invention. Flows of data are indicated by arrows.

The digital copying machine 1 implements the image processing apparatus of the present invention and performs predetermined processing for image data. In this embodiment, since the digital copying machine 1 also implements the image forming apparatus of the present invention, the digital copying machine 1 includes an image input device 2 that reads images of originals and a printer engine 3 serving as an output device that forms images on media such as sheets based on the image data of the originals read. As the predetermined processing for image data, the digital copying machine 1 executes reading of images of originals by the image input device 2 and printout of the read images by the printer engine 3. As a printing system of the printer engine 3, it is possible to use various systems like an ink jet system, a sublimation dye transfer printing system, a silver salt photograph system, a direct thermosensitive recording system, and a thermofusible transfer system other than an electrophotographic system.

The digital copying machine 1 in this embodiment uses a bus of the PCI Express standard to transfer image data and the like. The image input device 2, the printer engine 3, a memory 4, a compressor 5, and a hard disk (HDD) 6 are hardware resources serving as end points of the PCI Express standard. Switches 11 and 12 are switches of the PCI Express standard and an arbiter 13 is a root complex of the PCI Express standard.

Image data of an original read by the image input device 2 is temporarily stored in the memory 4 serving as a storage device. The image data is output to the printer engine 3 to form an image. It is possible to compression-encode the image data stored in the memory 4 with the compressor 5 and store the image data in the memory 4 again or store the image data in the HDD 6. An input/output area 21 of the memory 4 is a storage area that temporarily stores the image data read by the image input device 2. A storage area 22 is a storage area that stores the image data compression-encoded by the compressor 5. In other words, the storage areas 21 and 22 are a part of the memory 4 that is a single storage device divided for a plurality of applications. Input of data to and output of data from the memory 4 are arbitrated by the arbiter 13.

Storage areas and hardware resources that transmit data to and receive data from the storage areas are connected to the respective switches 11 and 12 as end points.

Specifically, the input/output area 21 and the image input device 2 that transmits image data to the input/output area 21 are connected to the identical switch 11. The printer engine 3 that outputs an image based on the image data stored in the input/output area 21 is also connected to the switch 11.

The compressor 5 that compresses image data and the storage area 22 are connected to the switch 12.

Since the storage areas and the hardware resources that transmit image data to and receive image data from the storage area are connected to the identical switch in this way, it is possible to prevent one memory bus from being always used in a transfer of image data as in the past. This makes it possible to prevent a shortage of bands of a memory bus and distribute loads of a data transfer.

Figure 17:
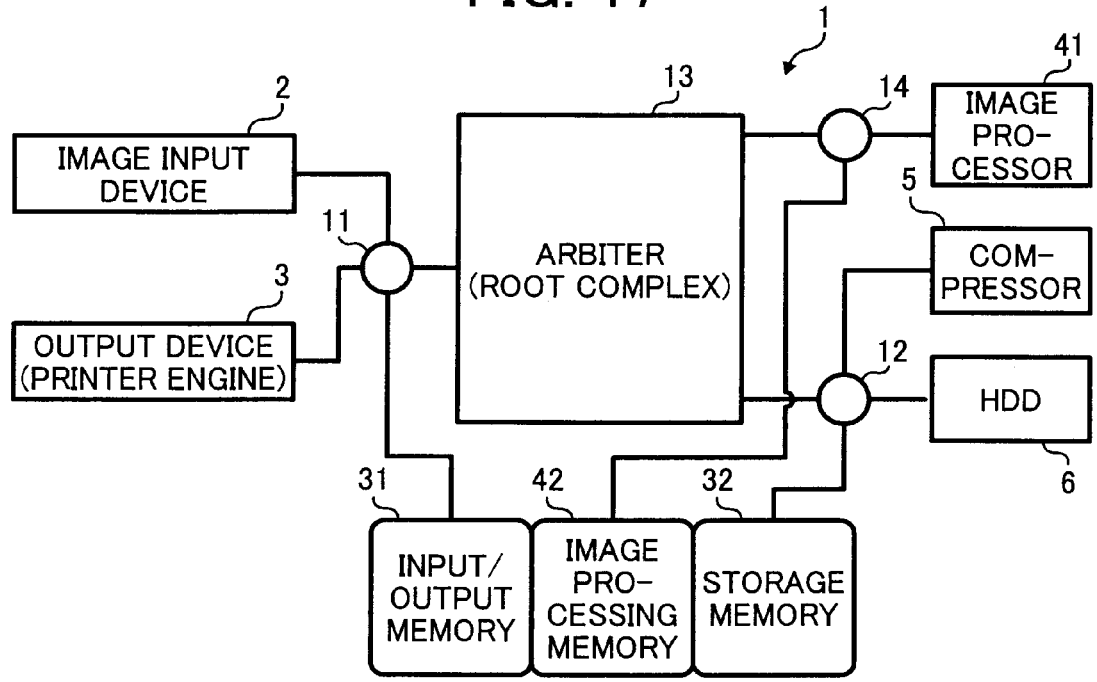
FIG. 17 is a schematic diagram of the digital copying machine added with an image processor and memories.

Since a bus of the PCI Express standard is used, it is unnecessary to worry about bands of a memory bus even when hardware resources and memories are additionally connected. In an example shown in FIG. 17, an input/output memory 31 and a storage memory 32 serving as memory devices independent from each other are used as storage areas equivalent to the input/output area 21 and the storage area 22. In additionally attaching an image processor 41 that applies predetermined image processing to image data and an image processing memory 42 serving as an independent memory device that stores the image data after the image processing, if the image processor 41 and the image processing memory 42 are connected to an identical switch 14, it is possible to prevent a shortage of bands of the memory bus and distribute loads of a data transfer even if the hardware resource and the memory are added.

In the example explained above, the image processing apparatus of the present invention is applied to the digital copying machine. However, the image processing apparatus of the present invention is not limited to this application. It is possible to apply the image processing apparatus of the present invention to various image processing apparatuses that perform predetermined processing for image data like a printer, a scanner, and a facsimile apparatus.

A second embodiment of the present invention will be explained with reference to FIGS. 18 to 20. Components same as those in the first embodiment are denoted by the same reference numerals and signs. Explanations of the components are omitted.

Figure 18:
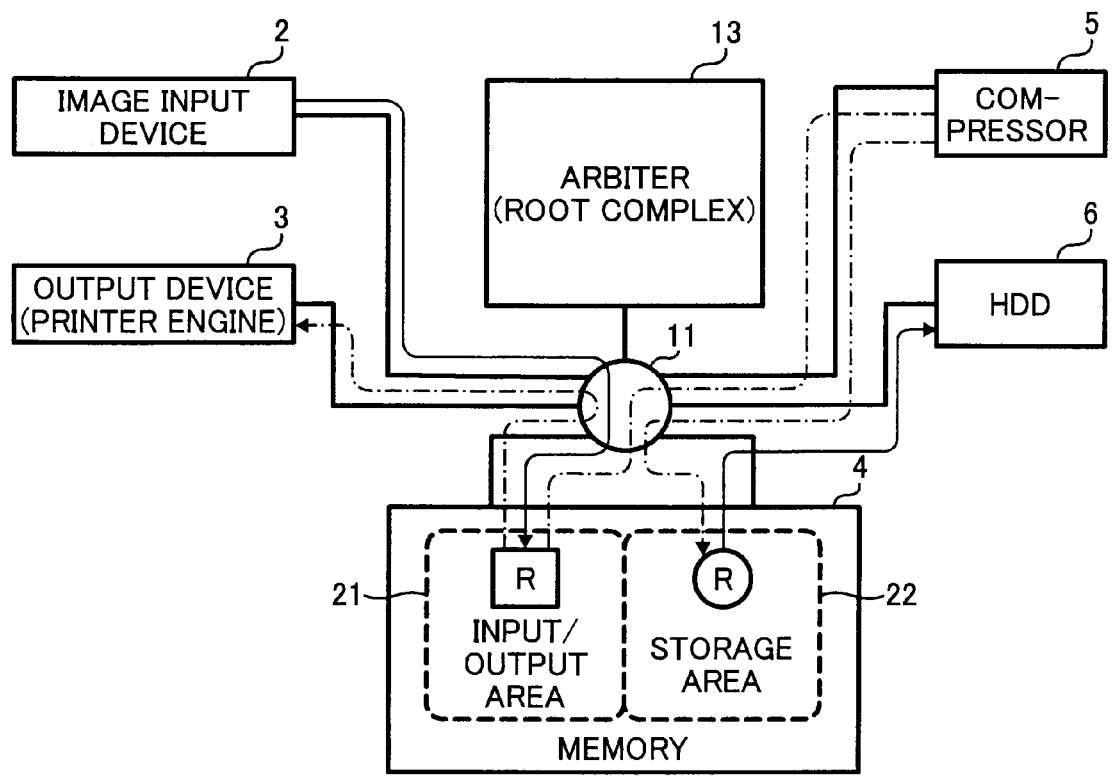
FIG. 18 is a block diagram of a digital copying machine according to a second embodiment of the present invention.

FIG. 18 is a block diagram of the digital copying machine 1 according to the second embodiment of the present invention. Flows of data are indicated by arrows.

The digital copying machine 1 in this embodiment uses a bus of the PCI Express standard to transfer image data and the like. The image input device 2, the printer engine 3, the memory 4, the compressor 5, and the hard disk (HDD) 6 are hardware resources serving as end points of the PCI Express standard. The switch 11 is a switch of the PCI Express standard and the arbiter 13 is a root complex of the PCI Express standard.

Image data of an original read by the image input device 2 is temporarily stored in the memory 4 serving as a storage device. The image data is output to the printer engine 3 to form an image. It is possible to compression-encode the image data stored in the memory 4 with the compressor 5 and store the image data in the memory 4 again or store the image data in the HDD 6. The input/output area 21 of the memory 4 is a storage area that temporarily stores the image data read by the image input device 2. The storage area 22 is a storage area that stores the image data compression-encoded by the compressor 5. In other words, the storage areas 21 and 22 are a part of the memory 4 that is a single storage device divided for a plurality of applications. Input of data to and output of data from the memory 4 are arbitrated by the arbiter 13.

Data transfers among the respective hardware resources include a data transfer from the image input device 2 to the input/output area 21, a data transfer from the input/output area 21 to the compressor 5, a data transfer from the input/output area 21 to the printer engine 3, a data transfer from the compressor 5 to the storage area 22, and a data transfer from the storage area 22 to the HDD 6.

Figure 19:
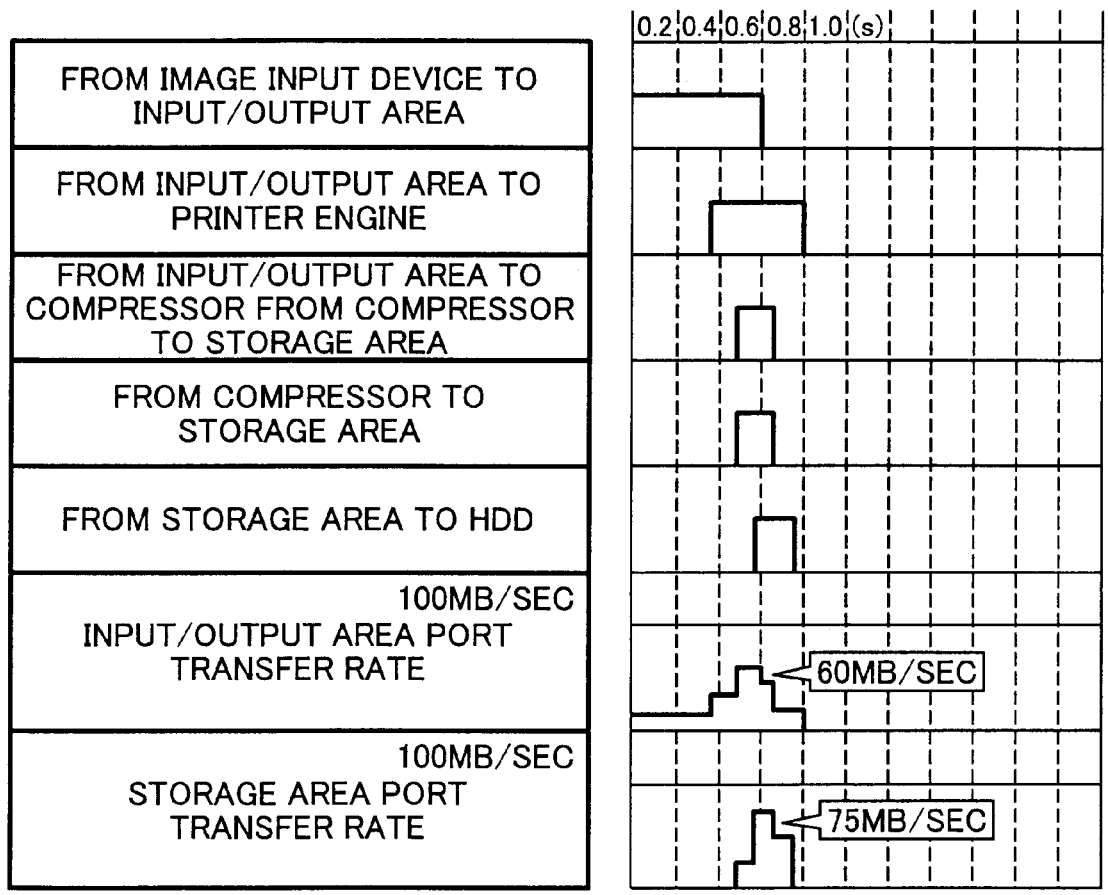
FIG. 19 is a schematic diagram for explaining times when respective data transfers occur and a sum of data transfer rates in ports of respective areas. (an input/output area and a storage area) of a memory.

For example, when it is assumed that a data transfer rate from the image input device 2 to the input/output area 21 is 15 MBytes/sec, a data transfer rate from the input/output area 21 to the printer engine 3 is 20 MBytes/sec, a data transfer rate from the input/output area 21 to the compressor 5 is 25 MBytes/sec, a data transfer rate from the compressor 5 to the storage area 22 is 25 MBytes/sec, and a data transfer rate from the storage area 22 to the HDD 6 is 50 MBytes/sec, transfer rates are as shown in FIG. 19. FIG. 19 is a schematic diagram for explaining times when respective data transfers occur and a sum of data transfer rates in ports of respective areas (an input/output area and a storage area) of a memory. Since the hardware resources are connected under the switch 11 of the PCI Express standard, a transfer rate in the input/output area is 60 MBytes/sec and a bus transfer rate in the port of the storage area is 75 MBytes/sec. In this way, it is possible to distribute loads of a data transfer.

Storage areas and hardware resources that transmit data to and receive data from the storage areas are connected to the switch 11 as end points.

Specifically, the input/output area 21 and the image input device 2 that transmits image data to the input/output area 21 are connected to the identical switch 11. The printer engine 3 that outputs an image based on the image data stored in the input/output area 21, the compressor 5 that compresses the image data, and the storage area 22 are also connected to the switch 11.

Since the storage areas and the hardware resources that transmit image data to and receive image data from the storage area are connected to the identical switch in this way, it is possible to prevent one memory bus from being always used in a transfer of image data as in the past. This makes it possible to prevent a shortage of bands of a memory bus and distribute loads of a data transfer.

In general, a bus for the data transfer from the input/output area 21 to the compressor 5 and a bus for the data transfer from the input/output area 21 to the printer engine 3 compete with each other. Thus, traffics are deteriorated.

Figure 20:
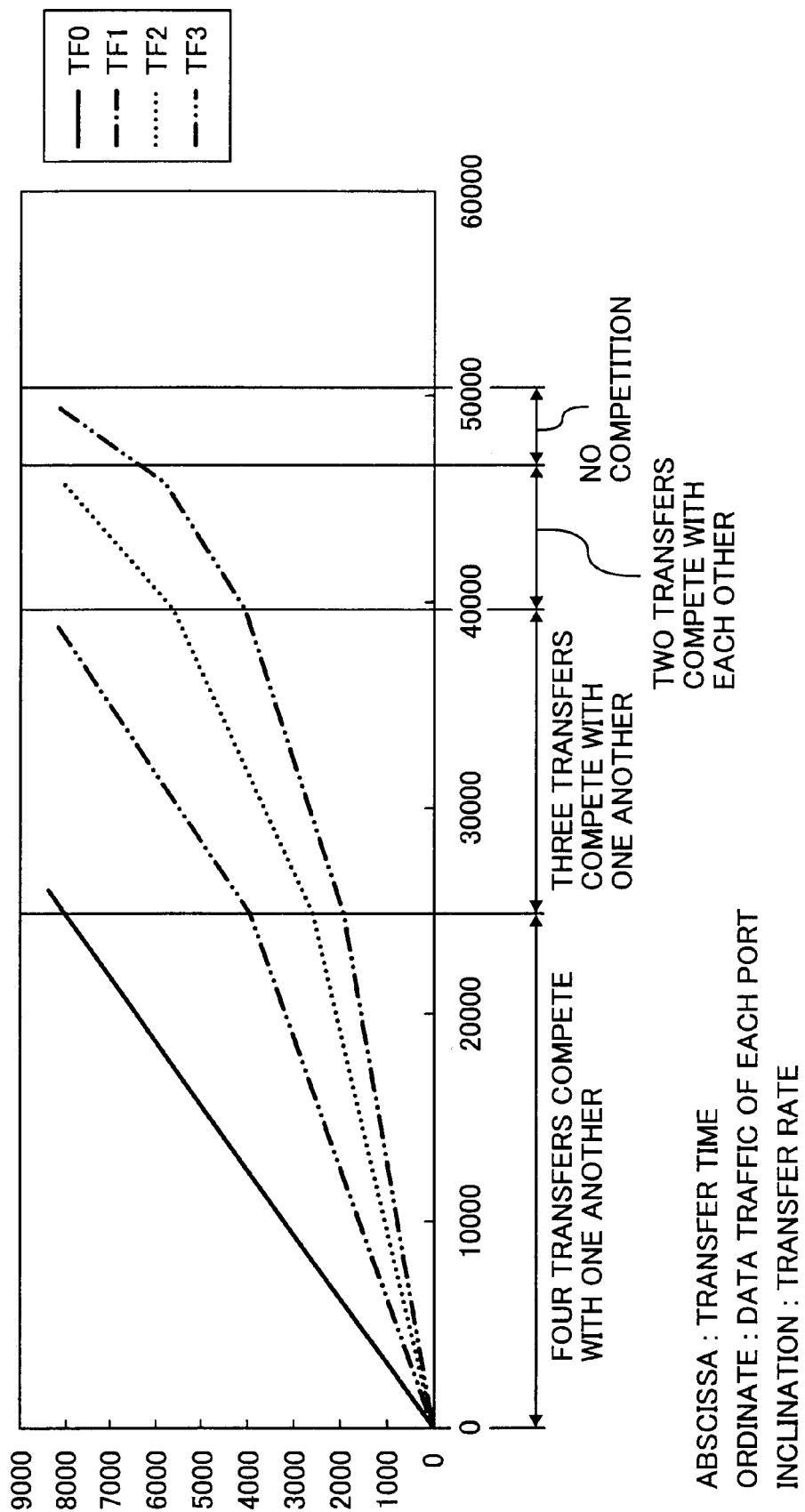
FIG. 20 is a graph showing a characteristic in which four traffics simultaneously start in output ports of a switch and the data transfers end in order according to data transfer rates.

FIG. 20 is a graph showing a characteristic in which four traffics simultaneously start in output ports of the switch 11 and the data transfers end in order according to data transfer rates. As shown in FIG. 20, according to this embodiment, inclinations of graphs of the respective traffics become steeper and the data transfer rates are improved according to a decrease in the number of competing traffics.

A third embodiment of the present invention is explained with reference to FIG. 21. Components same as those in the first embodiment are denoted by the same reference numerals. Explanations of the components are omitted.

Figure 21:
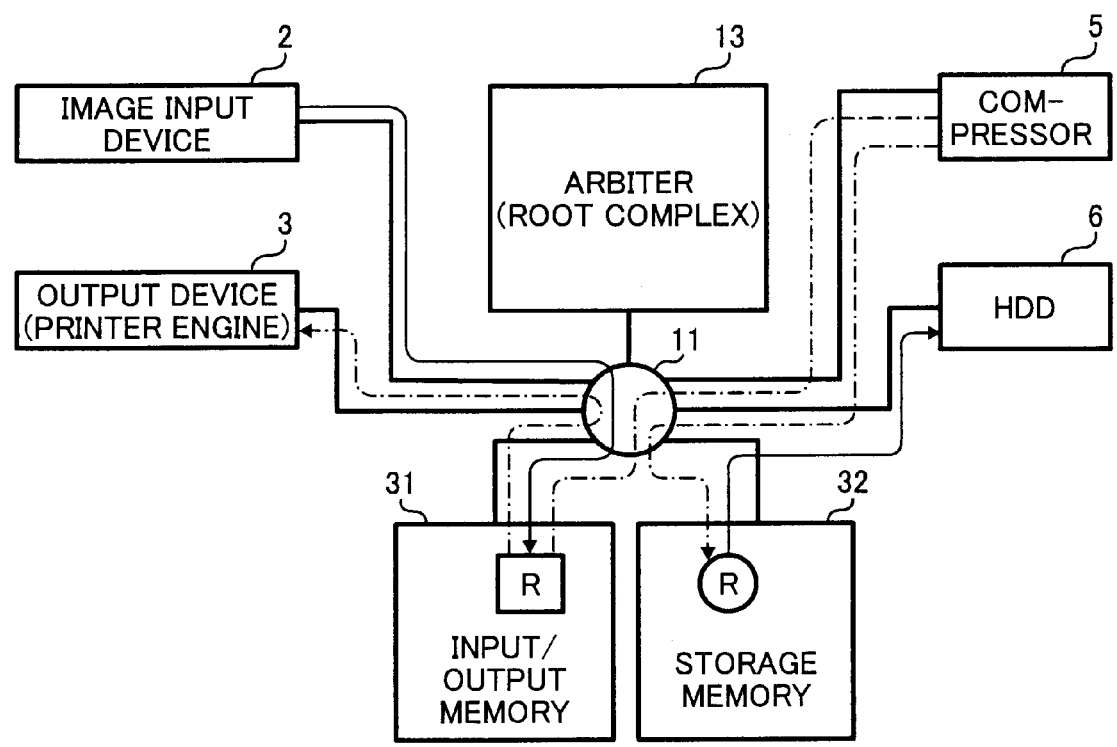
FIG. 21 is a block diagram of a digital copying machine according to a third embodiment of the present invention.
Figure 22:
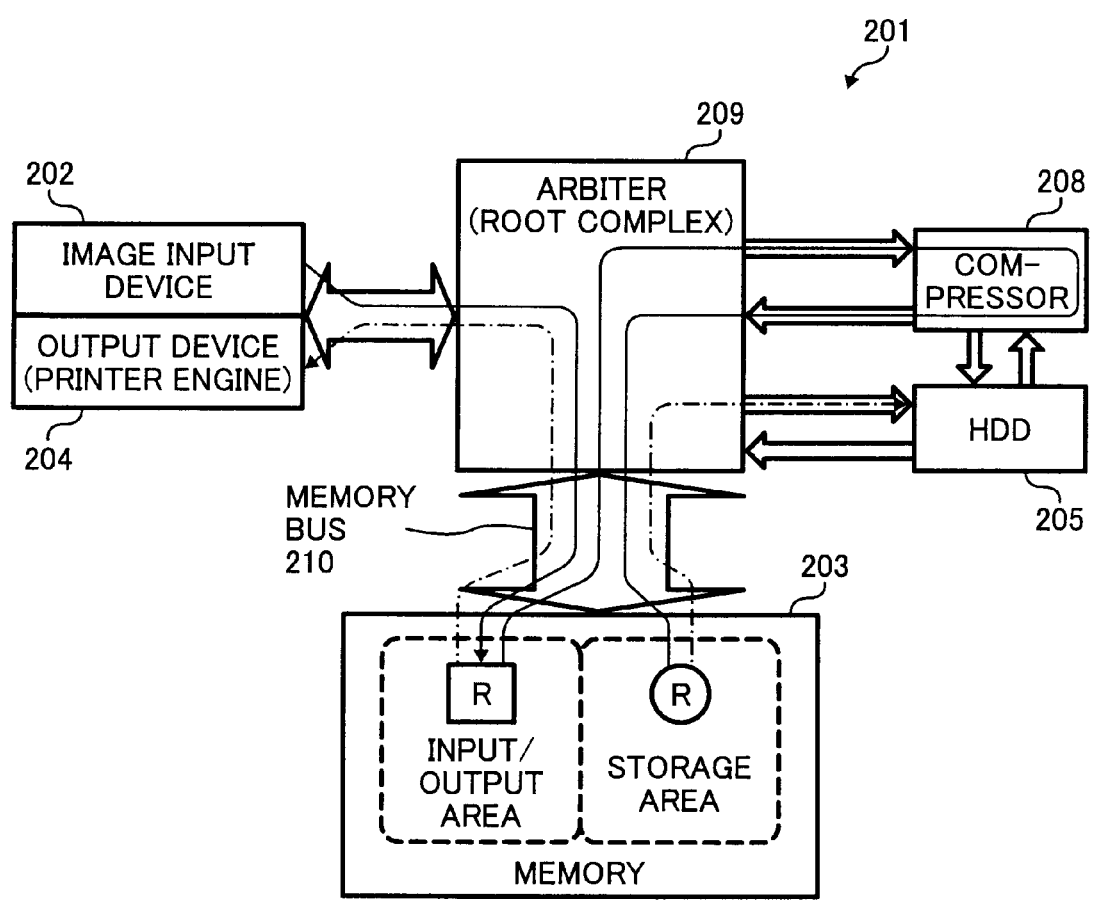
FIG. 22 is a schematic diagram for explaining a problem to be solved in the present invention.
Figure 23:
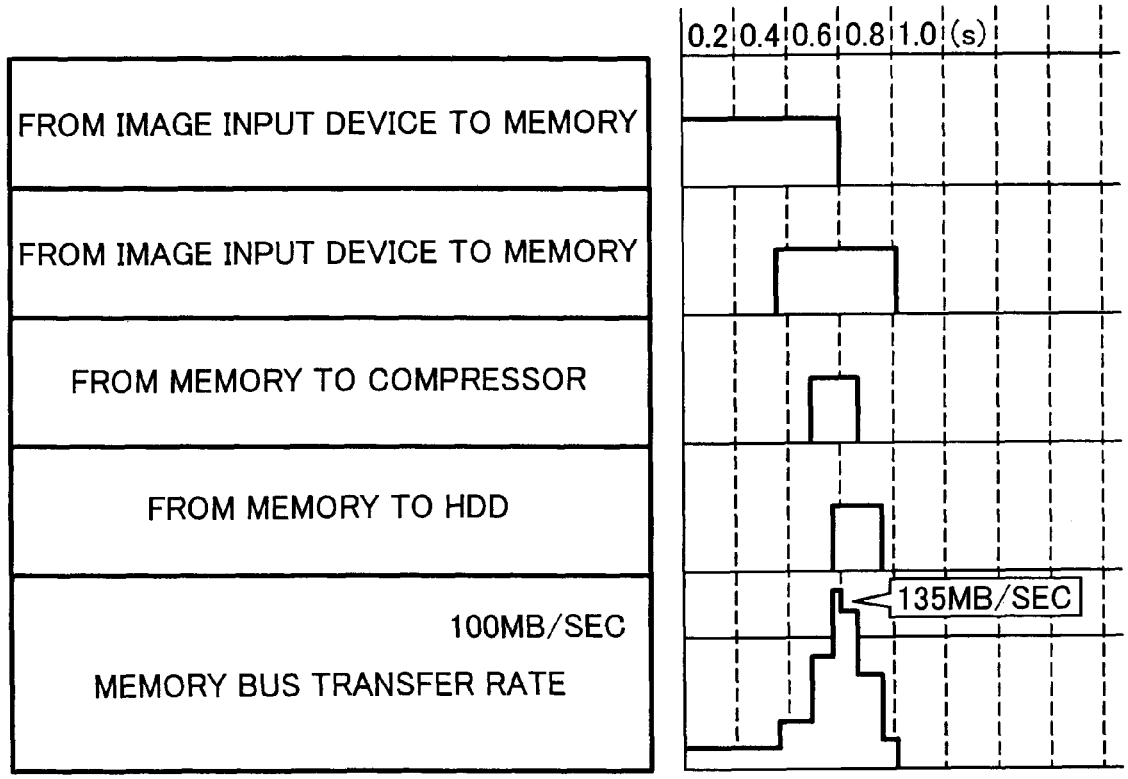
FIG. 23 is a schematic diagram for explaining times when respective data transfers occur and a sum of transfer rates of a memory bus.

FIG. 21 is a block diagram of the digital copying machine 1 according to a third embodiment of the present invention. Flows of image data are indicated by arrows.

The input/output memory 31 and the storage memory 32 serving as memory devices independent from each other are used as storage areas equivalent to the input/output area 21 and the storage area 22 explained in the first embodiment. If input/output memory 31 and the storage memory 32 are connected to an identical switch 11, it is possible to prevent a shortage of bands of a memory bus and distribute loads of a data transfer even if a hardware resource and a memory are added.

According to the present invention, since the storage area and the hardware resource are connected to the identical switch, it is possible to prevent one memory bus from being always used in a transfer of image data as in the past. This makes it possible to prevent a shortage of bands of a memory bus and distribute loads of a data transfer.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus that processes image data, the apparatus comprising:
 a bus;
 a memory configured to store the image data;
 a switch configured to transfer the image data; and
 hardware resources configured to transmit and receive the image data, wherein the memory includes a first area and a second area, a first one of the hardware resources is connected to the first area through the switch, and a second one of the hardware resources is connected to the second area through the switch.

2. The image processing apparatus according to claim 1, wherein the bus and the switch are peripheral-component-interconnect (PCI) Express compatible.

3. The image processing apparatus according to claim 1, wherein the memory is a single storage device divided into parts for a plurality of applications.

4. The image processing apparatus according to claim 1, wherein the hardware resources include an image input device configured to transmit the image data to the memory.

5. The image processing apparatus according to claim 1, wherein the hardware resources include an output device configured to output an image based on the image data stored in the memory.

6. The image processing apparatus according to claim 1, wherein
 the hardware resources include a compressor configured to compress the image data, and
 the memory is configured to store the compressed image data.

7. The image processing apparatus according to claim 1, wherein the switch comprises a first switch and a second switch, the first one of the hardware resources is connected to the first area through the first switch, and the second one of the hardware resources is connected to the second area through the second switch.

8. An image forming apparatus comprising:
an image input device configured to read an image to obtain image data;
a printer engine configured to form an image on a medium based on the image data;
a storage device configured to store the image data;
a memory configured to temporarily store the image data; and
a switch configured to transfer the image data between the image input device, the printer engine, the storage device and the memory, wherein
the memory includes an input/output area for temporarily storing the image data read by the image input device and a storage area for storing the image data, the image input device and the printer engine are connected to the input/output area through the switch, and the storage device is connected to the storage area through the switch.

9. The image forming apparatus according to claim 8, wherein the memory is a single storage device divided into parts for a plurality of applications.

10. The image forming apparatus according to claim 8, further comprising a compressor configured to compress the image data and connected to the storage area through the switch.

11. The image forming apparatus according to claim 8, wherein the switch comprises a first switch and a second switch, and the image input device and the printed engine is connected to the input/output area through the first switch and the storage device is connected to the storage area through the second switch.

12. The image processing forming apparatus according to claim 8, wherein a first storage data is transferred in the input/output area and a second storage data is transferred in the storage area simultaneously.

13. The image forming apparatus according to claim 12, wherein the first storage data is read from the input/output area at a same time that the second storage data is written in the storage area, and the first storage data is written in the input/output area at a same time that the second storage data is read from the storage area.

* * * * *